(12) United States Patent
Eustis

(10) Patent No.: US 7,762,179 B2
(45) Date of Patent: Jul. 27, 2010

(54) SYSTEM FOR NON-DELETERIOUS ACCELERATED AGING OF WINE OR SPIRITS

(76) Inventor: Robert H. Eustis, 862 Lathrop Dr., Stanford, CA (US) 94305

(*) Notice: Subject to any disclaimer, the term of this patent is extended or adjusted under 35 U.S.C. 154(b) by 0 days.

(21) Appl. No.: 11/856,893

(22) Filed: Sep. 18, 2007

(65) Prior Publication Data

US 2008/0000356 A1    Jan. 3, 2008

Related U.S. Application Data

(63) Continuation-in-part of application No. 11/284,673, filed on Nov. 21, 2005, which is a continuation of application No. 10/265,016, filed on Oct. 3, 2002, now Pat. No. 6,966,250.

(60) Provisional application No. 60/327,683, filed on Oct. 4, 2001.

(51) Int. Cl.
*C12G 1/00*   (2006.01)
*C12H 1/00*   (2006.01)

(52) U.S. Cl. ................... 99/277.2; 99/277.1

(58) Field of Classification Search ............. 99/277.2, 99/277.1, 348; 366/280, 352.8
See application file for complete search history.

(56) References Cited

U.S. PATENT DOCUMENTS

| | | | | |
|---|---|---|---|---|
| 57,009 | A | * | 8/1866 | Storm ................ 426/247 |
| 85,225 | A | * | 12/1868 | Gibson ............... 99/277.2 |
| 418,792 | A | * | 1/1890 | Hasbrouck ........... 426/262 |
| 697,579 | A | * | 4/1902 | Wehmeier et al. ...... 366/252 |
| 884,896 | A | * | 4/1908 | Johnson .............. 292/234 |
| 2,017,235 | A | | 10/1935 | Drew |
| 2,088,337 | A | * | 7/1937 | Plume ................ 99/277.2 |
| 2,198,661 | A | | 2/1938 | Farrier et al. |
| 2,114,009 | A | | 4/1938 | Ramsay |
| 2,203,229 | A | | 6/1940 | Nilsson et al. |
| 3,119,321 | A | * | 1/1964 | Deal ................ 99/277.1 |
| 3,942,423 | A | | 3/1976 | Herzfeld |
| 4,073,955 | A | | 2/1978 | Koppelman |
| 4,817,510 | A | * | 4/1989 | Kowalics et al. ......... 99/331 |
| 5,537,913 | A | | 7/1996 | Vowles |
| 5,647,268 | A | | 7/1997 | Sullivan |
| 6,378,419 | B1 | | 4/2002 | Ecklein |

FOREIGN PATENT DOCUMENTS

JP    63-44879    *    2/1988

* cited by examiner

*Primary Examiner*—Reginald L Alexander
(74) *Attorney, Agent, or Firm*—Meyer & Associates, LLC; Lee G. Meyer, Esq.

(57) ABSTRACT

A system and method for the non-deleterious acceleration of aging wine or spirits is described. The system employs a device, internal or external to the aging barrel, to induce a motion of the wine or spirits to be aged in excess of that inherent in the traditional aging process. The aging of wine or spirits is non-deleteriously accelerated by artificially increasing the movement of the liquid at the interface of the liquid and a semi-permeable wine aging container by mechanical means located internal or external to the semi-permeable container. In one aspect, the device is inserted into the barrel such as an impeller to mechanically move the Wine at the boundary layer, or a circulating for pump for hydraulic agitation. In another aspect, the device is exterior the barrel or container such as an external pump or fluidizer. Advantageously, the liquid is moved in a circular motion such that the liquid scrubs the barrel surface, while admixing the liquid by eddy currents.

18 Claims, 4 Drawing Sheets

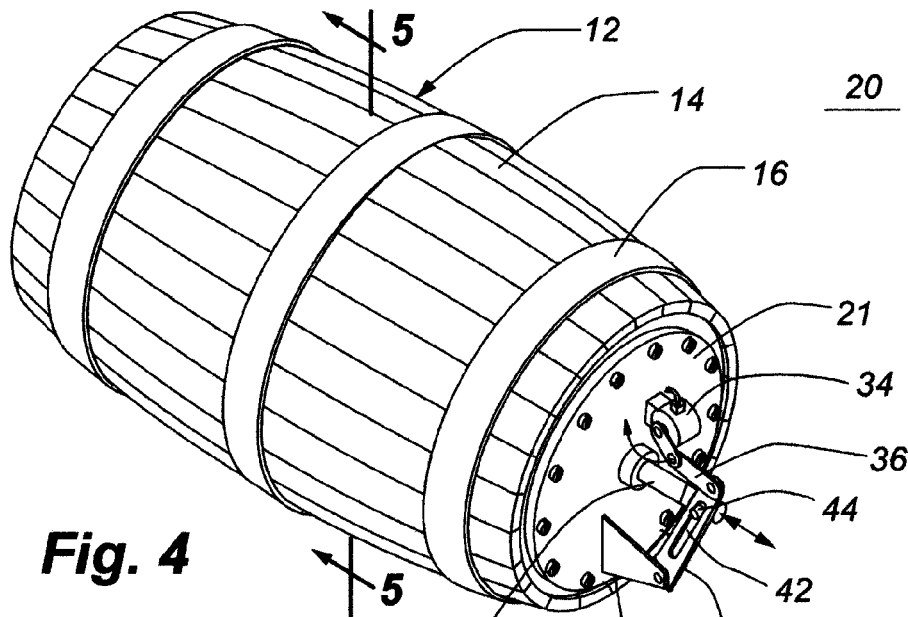
Fig. 4
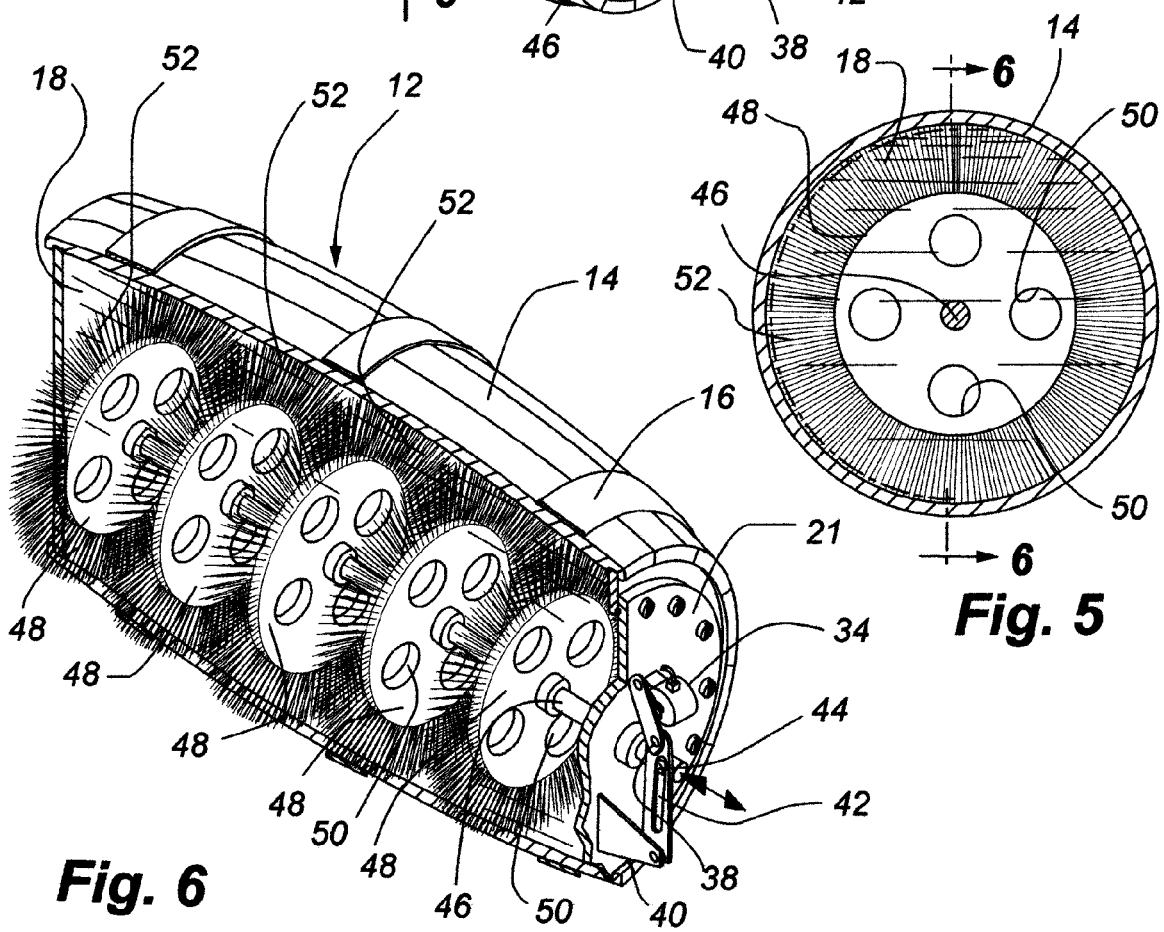
Fig. 5
Fig. 6

SYSTEM FOR NON-DELETERIOUS ACCELERATED AGING OF WINE OR SPIRITS

CROSS-REFERENCE TO RELATED APPLICATIONS

This application is a continuation-in-part application of U.S patent application Ser. No. 11/284,673 for Apparatus and Method for Aging Wine or Spirits filed on Nov. 21, 2005 which is a continuation of U.S. patent application Ser. No. 10/265,016, for Apparatus And Method for Aging Wine or Spirits filed Oct. 3, 2002, now U.S. Pat. No. 6,966,250, which claims the benefit of and priority to Provisional Application Ser. No. 60/327,683 filed Oct. 4, 2001.

BACKGROUND

The present system and device relate generally to an apparatus and method for non-deleteriously accelerating the aging of wine and/or spirits. In earlier days, wine making was practiced in very low volume by a few masters who handed the craft from generation to generation. Recently, however, the wine business has burgeoned into a multimillion dollar industry which stretches around the world. New vineyards, such as Napa Valley and Australia, have joined the traditional ranks of those in Italy, France, Spain, Portugal, and the like. Even though the demand for this commodity has increased multifold, the process by which the wine is made has remained pretty much the same. Thus, wineries have been forced to increase such things as vat volume, aging capacity, and the like. A limiting factor in further increasing production is the aging time.

In the making of many wines and spirits it is usual to age the wine or spirits in, for example, wooden barrels. "Barrel aging" is a centuries-old practice to improve the characteristics, such as taste and mellowness of wine. Certain aging techniques are used to impart a flavor and "soften" the wine. Usually, for quality wines, the barrels are made of oak. In recent years, synthetic barrels made of materials having limited porosity have been used and oak wood chips added for flavor. The drawback of barrel aging is the time that it takes to naturally age the fermented beverage.

The aging process, although complex, is thought to involve oxygen induced chemical reactions, including polymerization of short chain phenols. Thus, it is known that the infusion of oxygen through the barrel or container into the wine or spirits is important in the aging process. After the initial fermentation, present understanding suggests that the aging process improves the wine by polymerization of these phenols with the involvement of oxygen. During this barrel ageing process, water and alcohol are thought to diffuse out through the semi-permeable walls of the barrel and oxygen from the atmosphere diffuses in. The chemical reaction occurs in a region near the interface of the inner barrel wall and the wine called the Reaction Region. As a result, a concentration gradient of the products builds near the barrel wall known as the Reaction Barrier. The rate of reaction (ageing) is thought to be dependent on the concentration of the reactants at the Reaction Region and the removal of the products which form the Reaction Barrier. When the Reaction Barrier is allowed to create a boundary, it inhibits fresh wine from reaching the Reaction Region and the aging reaction is slowed. The replenishing of fresh wine through the Reaction Barrier layer has traditionally been accomplished only by diffusion or natural convection within the barrel.

The usual practice for barrel ageing is to leave the barrels in racks undisturbed except for periodic sampling or topping off as evaporation of the water and alcohol depletes the liquid. In some wineries the barrels are turned to provide some agitation or mixing of the body of the wine. This has little effect on the convection boundary layer, but favorably affects the diffusion profiles of the reactants in the ageing process. Because the effect on ageing rate is small and the effort is large, the turning of barrels is not done by the majority of winemakers.

While exposure to oxygen during racking and ageing in the barrel can be of benefit to the wine, excess oxygen can be deleterious and "sour" the wine. Thus, wines that are "corked" or have "turned" are examples of excess oxidation. Once a bottle of wine has been opened for some time, or if oxygen has seeped past a faulty cork, the oxidized wine will taste "off" and eventually sour. Therefore, accelerating aging by introduction of oxygen has to be controlled to prevent deleterious excessive oxidation.

Therefore, it would be advantageous to have a system and method for increasing the aging process without deleteriously affecting the wine. In my prior application, of which this is a continuation-in-part, now U.S. Pat. No. 6,966,250, an apparatus and method were disclosed, wherein a plurality of spaced hollow semi-permeable tubes which provide an interface wall between the wine or spirits and the atmosphere were placed in the barrel such that oxygen could infuse through the walls of the tube into the wine or spirits to enhance aging.

SUMMARY

It has now been discovered that aging of Wine can be non-deleteriously accelerated by artificially increasing the movement of the liquid at the interface of the liquid and a semi-permeable wine aging containers to breach the Reaction Barrier while bringing fresh wine to the Reaction Region. The system includes a device, internal or external to the semi-permeable wine aging container which mechanically induces a liquid motion in excess of that inherent in the traditional aging process thus continually bringing fresh wine to the Reaction Region to accelerate aging. In one aspect, the device is internal to the semi-permeable wine aging container, such as an impeller, or an internal circulating pump. In another aspect, the device is exterior to the semi-permeable wine aging container, such an external pump or fluidizer. The increased circulation may be substantially continuous, or intermittent. Advantageously, the liquid is caused to move in a circular motion to "scrub" the interior surface of the barrel while admixing the liquid by eddy currents. This is believed, without limitation, to maximize oxygen transfer from the semi-permeable surface of the wine aging container to the Reaction Region.

BRIEF DESCRIPTION OF THE DRAWINGS

The invention will be more clearly understood and appreciated from the following description when read in conjunction with the accompanying drawings in which:

FIG. 4 is a perspective view of a conventional Bordeaux wine barrel containing another embodiment of a motorized mechanical convection device in accordance with the instant system.

FIG. 5 is a cross sectional view of the Bordeaux barrel of FIG. 4 along lines 5-5.

FIG. 6 is a longitudinal sectional view of the Bordeaux wine barrel of FIG. 5 along lines 6-6.

DISCUSSION OF NOMENCLATURE

Figures 1, 2, 3:
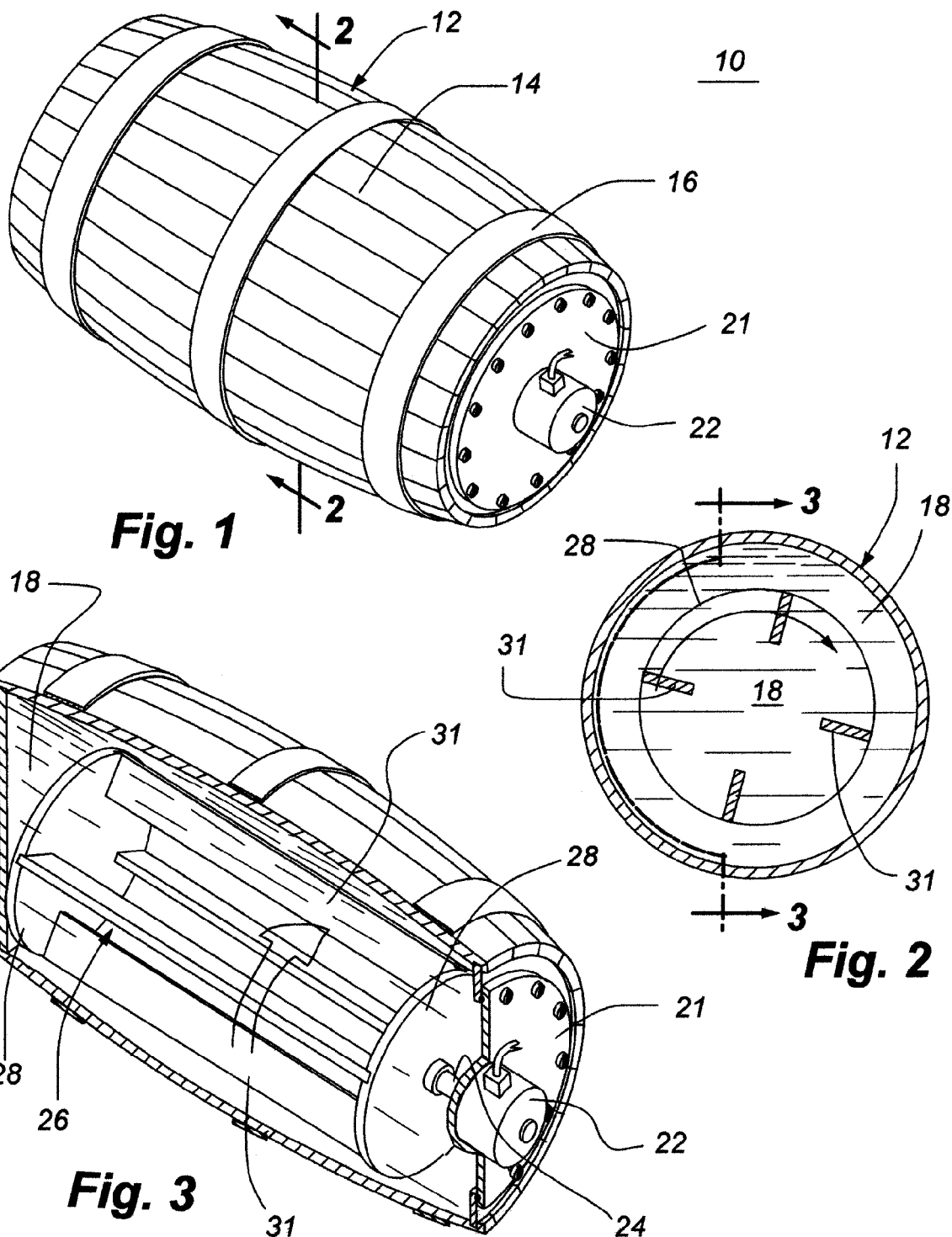
FIG. 1 is a perspective view of a conventional Bordeaux wine barrel containing one embodiment of a motorized mechanical convection device in accordance with the instant system.
FIG. 2 is a cross sectional view of the Bordeaux barrel of FIG. 1 along lines 2-2.
FIG. 3 is a longitudinal sectional view of the Bordeaux wine barrel of FIG. 2 along lines 3-3.

Aging Barrel means a semi-permeable container for Wine or spirits used to accomplish the aging process, not necessarily of wood.

Reaction Barrier means a region which naturally occurs between fresh Wine and the interior of the semi-porous container as a result of natural aging.

Reaction Region means the interface of the Wine and the interior surface of the semi-porous container in which the Wine is held.

Wine means wine and related spirits which undergo aging.

DETAILED DESCRIPTION OF EXEMPLARY EMBODIMENTS

Disclosed is a means for artificially enhancing the convection of liquid by, for example, mechanical means, into the Reaction Region. Basically, the Wine barrel or container is considered as a chemical reactor. The aging of Wine is a process which is related to the area of the interface between the Wine and the atmosphere and the rate at which fresh Wine is caused to interact with permeated oxygen at the participating area of the interface (Reaction Region) of the semi-permeable wall of the container. The rate of aging is expedited by increasing the rate at which fresh Wine is conveyed to the Reaction Region, as well as the disturbance of the naturally occurring Reaction Barrier which retards the reaction due to a buildup of reaction products. In accordance with the present system, the rate of exchange of fresh Wine to the Reaction Region may be increased well above that of conventional methods by a number of artificial internal and external convection apparatuses and techniques as will be more fully and completely described.

The configurations of the present apparatus and system provide for an air-permeable, container wall separating the Wine from the air, forming, there between, the Reaction Region where most of the aging takes place. The container walls are made of semi-permeable material such as oak, wood or other suitable (food grade) semi-permeable material which allows for the infusion of oxygen from the atmosphere through the walls of the container to interact with the Wine in the Reaction Region. The diffusion rate of oxygen through the staves of an oak barrel is slow so it is advantageous to decrease the oak barrel stave thickness or use a container made of a polymer or sintered stainless steel of controlled diffusivity. With the introduction of boundary layer thinning significant decreases in ageing time would be achieved. It should be understood that the oxygen source need not be solely atmospheric, but can be other compatible gas mixtures which contain oxygen.

As the reaction proceeds, the reaction products form a Reaction Barrier which must be breached by fresh reactants (Wine) in order for the aging process to proceed. A conventional, semi-permeable, staved oak barrel, having a top and bottom end, suitably sealed to the walls, for example, has a fixed volume and interior surface area through which air can permeate. A typical 59-gallon Bordeaux barrel, for example, has a belly diameter of about 27.5 inches and a contact area of 20 square feet. A diffusion of oxygen calculation for Wine in conventional aging shows that in six months a layer of only two inches is significantly affected.

The apparatus which moves the Wine within the Wine Barrel may be internal, such as a paddle, or external, such as a circulating pump which circulates the liquid internal the barrel. There are a number of materials semi-permeable to gases such as oxygen, but impermeable to liquid such as Wine, which are suitable containers. Commercial materials range from well-known Gore-Tex to sintered ceramics used for oxygen analysis. Although, the oak barrel is the conventional ageing vessel for Wine, these other materials and configurations are feasible and in some ways desirable. For example, a container made of a semi-porous polymer. In as much as the internal diffusion coefficient is increased by convection, the polymer material porosity may be adjusted to provide more rapid diffusion of oxygen resulting in a higher over-all reaction rate. If, as in much of the present Wine production, oak flavor needs to be introduced, it may be introduced by placing wood pieces or chips into the Wine when the air-permeable walls are made of material other than oak.

In configuring the container with the system, it is possible to retrofit a conventional barrel by making a hole in the barrel head or heads and introducing flange mounted convective equipment through the hole or holes. The opening is made tight by the flange seal. Similar configurations are available for containers made of other materials enumerated above.

Turning to the figures, there is shown in FIG. 1 a system 10 for non-deleteriously accelerating the Wine aging process. The system 10 includes a semi-pervious container illustrated as a standard Bordeaux barrel 12, including standard barrel staves 14 and retaining rings 16. At one end of barrel 12 is a conventional closing piece 18 (see FIG. 3) and on the other end, an end closing piece 21. Affixed to the end closing piece 21 is an electrical drive motor 22. As better shown in FIG. 3, drive motor 22 is attached to drive shaft 24 in a conventional manner wherein drive shaft 24 sealably passes through end closing piece 21. Disposed within barrel 12 is an impeller assembly 26, containing a pair of spaced apart end retaining elements 28, which support longitudinally placed impeller blades 31, which may be flexible, in a spaced apart relationship, as better seen in FIG. 2. As better seen in FIG. 3, impeller blades 31 are disposed outwardly of end retaining elements 28 and the edges of impeller blades 31 are in a spaced apart relationship with the inner surface of barrel 12.

In operation, energized drive motor 22 causes the impeller assembly 26 to rotate as, for example, in the direction of the arrow at a low RPM such as, for example, about ½ to about 1 RPM. This rotation of impeller assembly 26 causes the Wine to move within the barrel 12 causing fresh Wine to be induced by eddy current into the Reaction Region to enhance aging. Advantageously the body of Wine in the barrel 12 rotates in mass providing forced convection flow at the inside boundary of the barrel staves 14. It will be realized that the impeller can contain a single or a plurality of impeller blades. Advantageously, they are approximately the length of the barrel. The impeller blades may be rotated continuously or intermittently. The instant system is not designed to merely mix the Wine, but to promote forced convection at the inner surface of barrel 12. The impellers can be driven by mechanical, pneumatic, or magnetic drive from outside or inside the barrel. The drive can also be manual by linkage from interior to a crank exterior the barrel.

FIG. 4 shows another embodiment of the instant system. A system 20 for non-deleteriously accelerating the Wine aging process includes a semi-pervious container illustrated as a standard Bordeaux barrel 12, including standard barrel staves 14 and retaining rings 16. At one end of barrel 12 is a conventional closing piece 18 (see FIG. 6) and on the other end, an end closing piece 21. Affixed to the end closing piece 21 is an electrical drive motor 34. Drive motor 34 is attached to a radial drive arm 36 which, in turn, is movably attached to a follower arm 38 having an open elliptical slot 42. The other end of the follower arm 38 is pivotally attached to a retaining support 40. A cam follower 44 is rigidly attached to a push rod 46 which sealably passes through the end closing piece 21. Cam follower 44 slidably resides within open elliptical slot 42 such that, as radial drive arm 36 reciprocates, the push rod 46 is caused to move in and out of the barrel 12.

As better seen in FIG. 6, push rod 46, which sealably passes through end closing piece 21, travels completely through the longitudinal dimension of barrel 12 and sealably passes through closing piece 18 (not shown). Push rod 46 carries thereon disks 48 which are more or less equally spaced along push rod 46. The disks 48 advantageously contain one or more apertures 50 to allow easy motion of the disks in the Wine. In the embodiment shown in FIG. 6, disks 48 also contain, disposed around the periphery thereof flexible fingers or bristles 52, which further enhance the motion of the Wine to provide forced convection flow at the inside boundary of the barrel staves 14 to bring fresh Wine to the Reaction Region to non-deleteriously enhance aging.

In operation, the drive motor 34 causes the radial drive arm 36 to reciprocate in the direction shown by the arrows such that the follower arm 38 pivoted on retaining support 40 causes the push rod 46 to move up and down as the cam follower 44 moves along the open elliptical slot 42. As the push rod 46 moves axially within the barrel 12, the bristles 52, disposed upon disks 48, act to thin the Reaction Barrier by physically disturbing the Wine near the Reaction Region. The push rod 46 may contain a single disk 48 or a plurality of disks 48. It will be realized that the push rod 46 may be activated by a motor drive, manually, by pneumatic or liquid actuators, or magnetic drives internal or external to the barrel 12.

Figure 7:
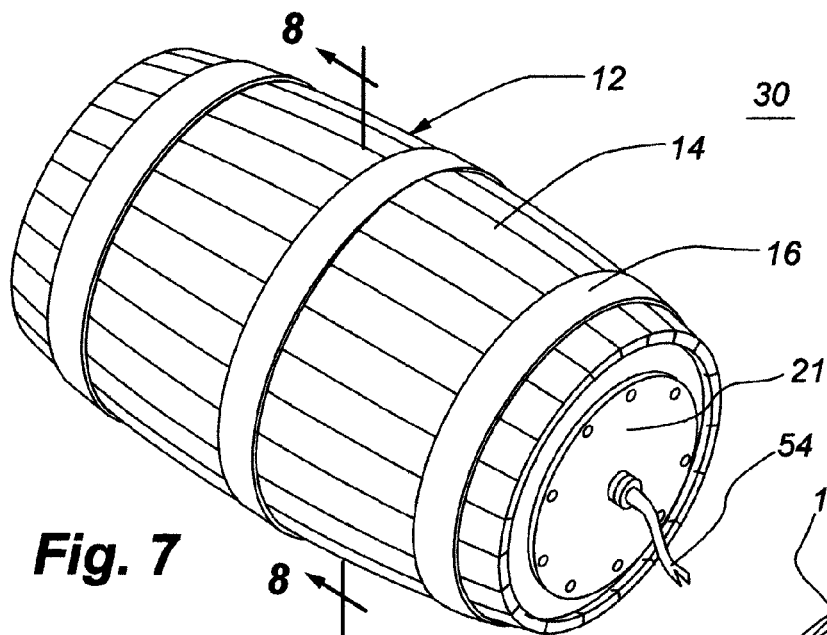
FIG. 7 is a perspective view of a conventional Bordeaux wine barrel containing another embodiment of a motorized mechanical convection device in accordance with the instant system.
Figure 9:
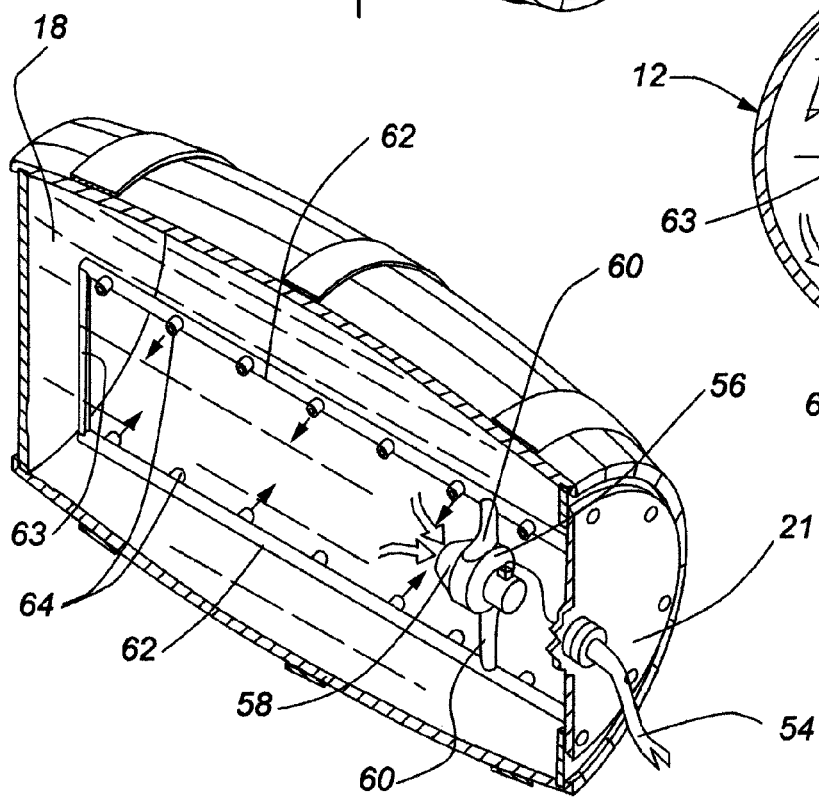
FIG. 9 is a longitudinal sectional view of the Bordeaux wine barrel of FIG. 8 along lines 9-9.
Figure 8:
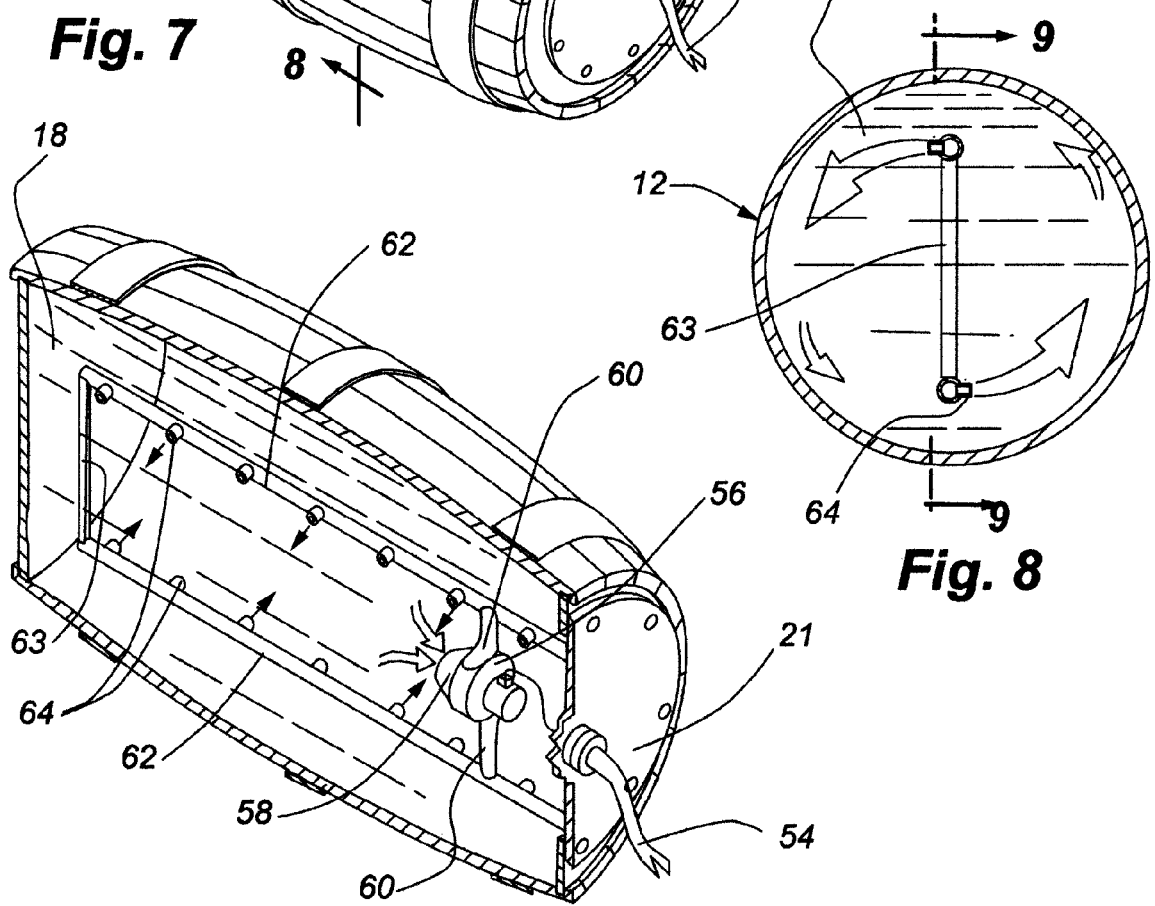
FIG. 8 is a cross sectional view of the Bordeaux barrel of FIG. 7 along lines 8-8.

Turning to FIG. 7, there is shown a further embodiment of the system for non-deleteriously accelerating the aging of Wine wherein forced convection is induced by an internal pump that feeds Wine through one or more stationary manifolds with communicating nozzles directed tangential to the Reaction Region. As shown in FIG. 7, the system 30 includes a semi-pervious container illustrated as a standard Bordeaux barrel 12, including standard barrel staves 14 and retaining rings 16. At one end of barrel 12 is a conventional closing piece 18 (see FIG. 9) and on the other end, an end closing piece 21. Sealably penetrating the end closing piece 21 is an electrical connection wire 54 electrically connected to an internal pump motor 56. As better shown in FIG. 9, the exit side of pump motor 56 communicates with manifolds 62 by way of connecting tubes 60. Disposed along manifold 62 are a plurality of communicating nozzles 64 directed tangentially to the inside surface of the barrel 12.

Upon activation of pump motor 56, Wine is caused to be drawn into pump inlet 58 and exit through connecting tubes 60 into manifolds 62 and thus through nozzles 64 to affect a liquid circulation pattern (as shown by the arrows in FIG. 9) to physically disturb the Reaction Barrier allowing fresh Wine to enter the Reaction Region. The pump may reside interior or exterior the barrel 12.

Figures 10, 11, 12:
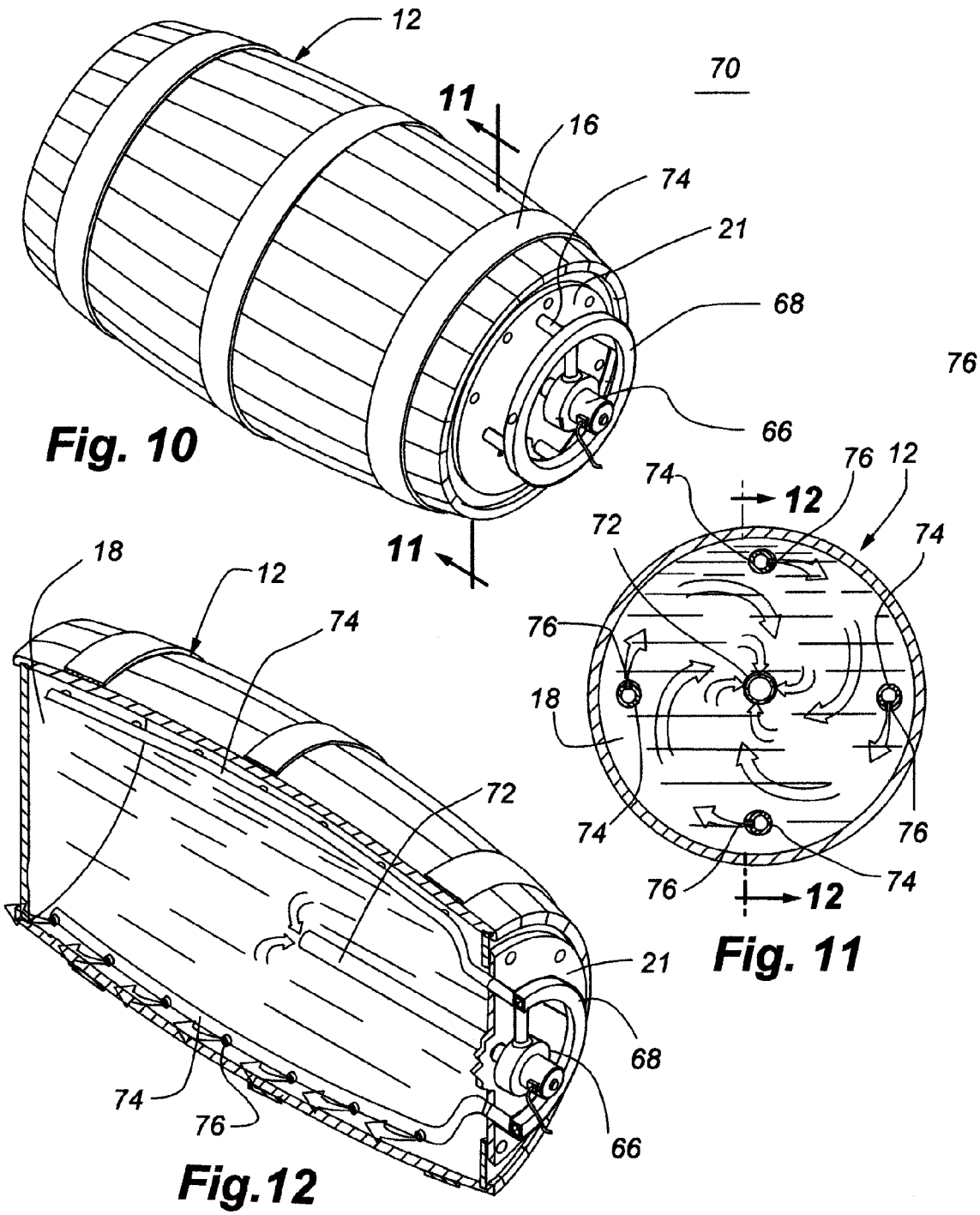
FIG. 10 is a perspective view of a conventional Bordeaux wine barrel containing another embodiment of a motorized mechanical convection device in accordance with the instant system.
FIG. 11 is a cross sectional view of the Bordeaux barrel of FIG. 10 along lines 11-11.
FIG. 12 is a longitudinal sectional view of the Bordeaux wine barrel of FIG. 11 along lines 12-12.

Turning to FIG. 10, there is shown a further embodiment of the system for non-deleteriously accelerating the Wine aging process wherein forced convection is induced by an external pump that feeds Wine through one or more stationary manifolds with communicating nozzles directed tangential to the Reaction Region. As shown in FIG. 10, the system 70 includes a semi-pervious container illustrated as a standard Bordeaux barrel 12, including standard barrel staves 14 and retaining rings 16. At one end of barrel 12 is a conventional closing piece 18 (see FIG. 12) and on the other end, an end closing piece 21. An electric pump motor 66 is attached to end closing piece 21 exterior barrel 12. As better shown in FIG. 12, the exit side of pump motor 66 communicates with dispersion tubes 74 by way of a connecting manifold 68. Pump motor 66 communicates with manifold 68 and inlet tube 72. Manifold 68 in turn communicates with distribution tubes 74 which contain a plurality of nozzles 76 disposed thereon, which are set tangentially to the interior surface of barrel 12.

In operation, pump motor 66 is energized causing Wine to pass into inlet tube 72 and exit into manifold 68 and then though distribution tubes 74 exiting nozzles 76 to affect a liquid circulation pattern (as shown by the arrows in FIG. 11) to physically disturb the Reaction Barrier allowing fresh Wine to enter the Reaction Region.

It will be realized by the skilled artisan that other embodiments in accordance with the instant system will accomplish similar results and are intended to be included within the scope of the appended claims. For example, drive and pump motors can be manual, pneumatic, magnetic, or the like. The number of impeller blades and/or distribution tubes and/or nozzles is not critical to the system. The sole requirement of the system is that the Wine is moved in a manner such that the Reaction Barrier is breached such that fresh Wine reaches the Reaction Region.

The foregoing descriptions of specific embodiments of the present invention are presented for the purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A system for non-deleteriously accelerating the wine aging process comprising:

a semi-permeable wine aging container having an exterior surface and an interior surface;

a reaction barrier, formed proximate the interior surface when said wine aging container is full of wine such that said wine is in contact with said interior surface of the wine aging container;

a rotateable impeller, mounted interior said container, for moving said wine in a circular motion within the container to scrub said interior surface of the container, breaching said reaction barrier;

means for energizing said impeller at a speed for moving the wine to non-deleteriously accelerate the wine aging process.

2. The system of claim 1 wherein said impeller moves the wine within said semi-permeable wine aging container to affect continuous movement of the wine.

3. The system of claim 1 wherein said impeller moves the wine within said semi-permeable wine aging container to affect intermittent movement of the wine.

4. The system of claim 1 wherein said means for energizing said impeller is mounted internal the semi-permeable wine aging container.

5. The system of claim 1 wherein said impeller is energized pneumatically, electrically, magnetically, or manually.

6. The system of claim 1 wherein said semi-permeable wine aging container is selected from oak barrel, sintered ceramics, and semi-porous polymers.

7. The system of claim 1 wherein said means for energizing said impeller is mounted external said semi-permeable wine aging container.

8. A system for non-deleteriously accelerating the wine aging process comprising:

a semi-permeable wine aging container having an exterior surface and an interior surface;

a reaction barrier, formed proximate the interior surface when said wine aging container is full of wine such that the wine is in contact with said interior surface of the aging container;

an impeller, mounted internal the semi-permeable wine aging container, in communication with the wine for accelerating the movement of the wine such that the wine, scrubs the interior surface of the semi-permeable wine aging container to breach the reaction barrier;

means for energizing said impeller to provide the accelerated movement of the wine such that the wine aging process is non-deleteriously accelerated.

9. The system of claim 8 wherein said means for energizing said impeller is selected from pneumatic, electric, magnetic, or manual.

10. The system of claim 8 wherein said means for energizing said impeller is external or internal the semi-permeable wine aging container.

11. The system of claim 8 wherein said impeller is caused to rotate within the semi-permeable wine aging container.

12. The system of claim 8 wherein said impeller is caused to reciprocate within the semi-permeable wine aging container.

13. The system of claim 12 wherein said impeller comprises a push rod carrying spaced apart disks perpendicular to the push rod which disks reciprocate within the semi-permeable wine aging container.

14. The system of claim 13 wherein said disks have flexible bristles mounted on the periphery thereof.

15. A system for non-deleteriously accelerating the wine aging process comprising:

A liquid circulating pump having an inlet and an outlet in communication with the wine for accelerating the movement of the wine in a semi-permeable wine aging container to breach the reaction barrier;

means for energizing said pump to provide accelerated movement of the wine such that the wine, which is in substantial contact with all surfaces of the container, is caused to move in a circular motion to scrub the interior surface of the semi-permeable wine aging container in excess of that inherent in the traditional aging process such that the wine aging process is non-deleteriously accelerated.

16. The system of claim 15 wherein said liquid circulating pump is mounted external to the semi-permeable wine aging container to circulate the wine internal the container.

17. The system of claim 15 wherein said liquid circulating pump is mounted internal the semi-permeable wine aging container to circulate the wine internal the container.

18. The system of claim 15 wherein the outlet of the liquid circulating pump causes the wine to exit through a plurality of nozzles disposed tangentially to the inside surface of the container.

* * * * *